US00RE35317E

United States Patent [19]

Lindsay

[11] E Patent Number: Re. 35,317

[45] Reissued Date of Patent: Aug. 27, 1996

[54] POTENTIOSTATIC PREPARATION OF MOLECULAR ADSORBATES FOR SCANNING PROBE MICROSCOPY

[75] Inventor: Stuart M. Lindsay, Tempe, Ariz.

[73] Assignee: The Arizona Board of Regents, Tempe, Ariz.

[21] Appl. No.: 321,649

[22] Filed: Oct. 11, 1994

Related U.S. Patent Documents

Reissue of:

[64] Patent No.: 5,155,361
Issued: Oct. 13, 1992
Appl. No.: 736,095
Filed: Jul. 26, 1991

[51] Int. Cl.[6] ..... H01J 37/26; H01J 37/20; G01N 1/28

[52] U.S. Cl. ..... 250/307; 250/304; 250/440.11; 361/234; 204/400; 204/403; 205/780.5; 205/794.5

[58] Field of Search ..... 250/307, 304, 250/440.1, 306; 361/234; 204/153.1, 400, 403

[56] References Cited

U.S. PATENT DOCUMENTS

| | | | |
|---|---|---|---|
| Re. 33,387 | 10/1990 | Binnig | 250/306 |
| Re. 34,331 | 8/1993 | Elings et al. | 250/306 |
| Re. 34,489 | 12/1993 | Hansma et al. | 250/560 |
| 4,343,993 | 8/1982 | Binnig et al. | 250/306 |
| 4,422,002 | 12/1983 | Binnig et al. | 310/328 |
| 4,520,570 | 6/1985 | Bednorz et al. | 33/180 |
| 4,668,865 | 5/1987 | Gimzewski et al. | 250/306 |
| 4,724,318 | 2/1988 | Binnig | 250/306 |
| 4,785,177 | 11/1988 | Besocke | 250/442.1 |
| 4,800,274 | 1/1989 | Hansma et al. | 250/306 |
| 4,806,755 | 2/1989 | Duerig et al. | 250/306 |
| 4,823,004 | 4/1989 | Kaiser et al. | 250/306 |
| 4,837,435 | 6/1989 | Sakuhara et al. | 250/306 |

(List continued on next page.)

OTHER PUBLICATIONS

Baselt, et al., "Scanned–cantilever atomic force microscope", Rev. Sci. Instrum. 64(4), Apr. 1993, pp. 908–911.

Bezanilla, et al., "Adsorption of DNA to Mica, Silylated Mica, and Minerals: Characterization by Atomic Force Microscopy", Langmuir, vol. 11, No. 2, 1995, pp. 655–659.

Booth, et al., "Silicia–Supported Cyclopentadienyl–Rhodium(I), –Cobalt(I), and –Titanium(IV) Complexes", Journal of Organometallic Chemistry, 315 (1986), pp. 143–156.

DeRose, et al., "Comparative Scanning Probe Microscopy Study of the Surface Morphology of Au Films Grown from the Vapor onto Glass Fused Silicia", J. Vac. Sci. Technology. A. 11(4), Jul./Aug. 1993, pp. 776–780.

The FASEB Journal, vol. 6, No. 1, No. 855, Jan. 1, 1992.

Frisbie, et al., "Functional Group Imaging by Chemical Force Microscopy", Science, vol. 265, Sep. 30, 1994, pp. 2071–2074.

Hansma, et al., "Atomic Force Microscopy of DNA in Aqueous Solutions", Nucleic Acids Research, 1993, vol. 21, No. 3, pp. 505–512.

Lindsay, et al., "Scanning Tunneling Microscopy and Atomic Force Microscopy Studies of Biomaterials at a Liquid–Solid Interface", J. Vac. Sci. Technol. A., vol. 11, No. 4, Jul./Aug. 1993, pp. 808–815.

Lyubchenko, et al., "Atomic Force Microscopy of Long DNA: Imaging in Air and Under Water", Proc. Natl. Acad. Sci. USA, Mar. 1993, vol. 90, pp. 2137–2140.

(List continued on next page.)

*Primary Examiner*—Jack I. Berman
*Attorney, Agent, or Firm*—D'Alessandro & Ritchie

[57] ABSTRACT

[A method of] *An apparatus and method for* preparing molecular adsorbates for scanning probe microscopy by potentiostatic methods. Negatively charged molecules are deposited upon and held to a substrate with an electrochemical cell having a gold substrate, a platinum wire counter electrode and a silver wire reference electrode. The polymer to be observed is dissolved into a buffer solution which is non-reactive with the substrate which is gold (111).

40 Claims, 1 Drawing Sheet

U.S. PATENT DOCUMENTS

| | | | |
|---|---|---|---|
| 4,866,271 | 9/1989 | Ono et al. | 250/306 |
| 4,868,396 | 9/1989 | Lindsay | 250/440.1 |
| 4,871,938 | 10/1989 | Elings et al. | 310/328 |
| 4,877,957 | 10/1989 | Okada et al. | 250/306 |
| 4,889,988 | 12/1989 | Elings et al. | 250/306 |
| 4,902,892 | 2/1990 | Okayama et al. | 250/307 |
| 4,914,293 | 4/1990 | Hayashi et al. | 250/306 |
| 4,924,091 | 5/1990 | Hansma et al. | 250/306 |
| 4,935,634 | 6/1990 | Hansma et al. | 250/560 |
| 4,947,042 | 8/1990 | Nishioka et al. | 250/306 |
| 4,952,857 | 8/1990 | West et al. | 318/561 |
| 4,954,704 | 9/1990 | Elings et al. | 250/307 |
| 4,956,817 | 9/1990 | West et al. | 365/189.01 |
| 4,962,480 | 10/1990 | Ooumi et al. | 365/151 |
| 4,968,390 | 11/1990 | Bard et al. | 204/15 |
| 4,968,914 | 11/1990 | West et al. | 310/328 |
| 4,969,978 | 11/1990 | Tomita et al. | 204/153.1 |
| 4,992,659 | 2/1991 | Abraham et al. | 250/306 |
| 4,992,728 | 2/1991 | McCord et al. | 324/158 |
| 4,999,494 | 3/1991 | Elings | 250/306 |
| 4,999,495 | 3/1991 | Miyata et al. | 250/306 |
| 5,003,815 | 4/1991 | Martin et al. | 73/105 |
| 5,009,111 | 4/1991 | West et al. | 73/862.61 |
| 5,017,010 | 5/1991 | Mamin et al. | 356/345 |
| 5,018,865 | 5/1991 | Ferrell et al. | 356/376 |
| 5,025,658 | 6/1991 | Elings et al. | 73/105 |
| 5,047,633 | 9/1991 | Finlan et al. | 250/306 |
| 5,051,646 | 9/1991 | Elings et al. | 310/317 |
| 5,066,858 | 11/1991 | Elings et al. | 250/307 |
| 5,077,473 | 12/1991 | Elings et al. | 250/306 |
| 5,081,390 | 1/1992 | Elings | 310/328 |
| 5,103,095 | 4/1992 | Elings et al. | 250/306 |
| 5,107,113 | 4/1992 | Robinson | 250/306 |
| 5,107,114 | 4/1992 | Nishioka et al. | 250/306 |
| 5,117,110 | 5/1992 | Yasutake | 250/306 |
| 5,120,959 | 6/1992 | Tomita | 250/306 |
| 5,141,319 | 8/1992 | Kajimura et al. | 356/358 |
| 5,142,145 | 8/1992 | Yasutake | 250/306 |
| 5,144,833 | 9/1992 | Amer et al. | 73/105 |
| 5,155,361 | 10/1992 | Lindsay | 250/307 |
| 5,155,715 | 10/1992 | Ueyema et al. | 369/44.11 |
| 5,157,251 | 10/1992 | Albrecht et al. | 250/216 |
| 5,166,516 | 11/1992 | Kajimura | 250/234 |
| 5,168,159 | 12/1992 | Yagi | 250/306 |
| 5,189,906 | 3/1993 | Elings et al. | 73/105 |
| 5,196,713 | 3/1993 | Marshall | 250/561 |
| 5,198,715 | 3/1993 | Elings et al. | 310/328 |
| 5,202,004 | 5/1993 | Kwak et al. | 204/153 |
| 5,204,531 | 4/1993 | Elings et al. | 250/306 |
| 5,206,702 | 4/1993 | Kato et al. | 356/358 |
| 5,210,410 | 5/1993 | Barrett | 250/234 |
| 5,224,376 | 7/1993 | Elings et al. | 73/105 |
| 5,229,606 | 7/1993 | Elings et al. | 250/306 |
| 5,231,286 | 7/1993 | Kajimura et al. | 250/234 |
| 5,237,859 | 8/1993 | Elings et al. | 73/105 |
| 5,245,863 | 9/1993 | Kajimura et al. | 73/105 |
| 5,247,186 | 9/1993 | Toda | 250/561 |
| 5,253,516 | 10/1993 | Elings et al. | 73/105 |
| 5,257,024 | 10/1993 | West | 341/16 |
| 5,258,107 | 11/1993 | Yoshida et al. | 204/129.55 |
| 5,260,567 | 11/1993 | Kuroda et al. | 250/227.19 |
| 5,260,622 | 11/1993 | West | 310/328 |
| 5,260,824 | 11/1993 | Okada et al. | 359/368 |
| 5,262,643 | 11/1993 | Hammond et al. | 250/306 |
| 5,266,801 | 11/1993 | Elings et al. | 250/306 |
| 5,266,896 | 11/1993 | Rugar et al. | 324/307 |
| 5,266,897 | 11/1993 | Watanuki et al. | 324/244 |
| 5,267,471 | 12/1993 | Abraham et al. | 73/105 |
| 5,274,230 | 12/1993 | Kajimura et al. | 250/234 |
| 5,276,324 | 1/1994 | Ohtaki et al. | 250/306 |
| 5,280,341 | 1/1994 | Nonnenmacher et al. | 356/358 |
| 5,283,437 | 2/1994 | Greschner et al. | 250/306 |
| 5,283,442 | 2/1994 | Martin et al. | 250/561 |
| 5,286,977 | 2/1994 | Yokoyama et al. | 250/442.11 |
| 5,289,004 | 2/1994 | Okada et al. | 250/306 |
| 5,291,775 | 3/1994 | Gamble et al. | 73/105 |
| 5,293,042 | 3/1994 | Miyamoto | 250/306 |
| 5,294,804 | 3/1994 | Kajimura | 250/561 |
| 5,296,704 | 3/1994 | Mishima et al. | 250/306 |
| 5,298,975 | 3/1994 | Khoury et al. | 356/375 |
| 5,304,924 | 4/1994 | Yamano et al. | 324/158 R |
| 5,306,919 | 4/1994 | Elings et al. | 250/442.11 |
| 5,307,693 | 5/1994 | Griffith et al. | 73/862.68 |
| 5,308,974 | 5/1994 | Elings et al. | 250/234 |
| 5,314,254 | 5/1994 | Yashar et al. | 384/49 |
| 5,314,829 | 5/1994 | Coles | 436/165 |
| 5,317,153 | 5/1994 | Matsushiro et al. | 250/306 |
| 5,319,960 | 6/1994 | Gamble et al. | 73/105 |
| 5,321,977 | 6/1994 | Clabes et al. | 73/105 |
| 5,323,003 | 6/1994 | Shido et al. | 250/306 |
| 5,324,935 | 6/1994 | Yasutake | 250/234 |
| 5,325,010 | 6/1994 | Besocke et al. | 310/317 |

OTHER PUBLICATIONS

Lyubchenko, et al., "Atomic force microscopy of DNA and bateriophage in air, water and propanol: the role of adhesion forces", Nucleic Acids Research, 1993, vol. 21, No. 3, pp. 1117–1123.

Lyubchenko, et al., "A technique for stable adhesion of DNA to a modified graphite surface for imaging by scanning tunneling microscopy", J. Vac. Sci. Technol. B. 9(2), Mar./Apr. 1991, 1288–1290.

Lyubchenko, et al., "Atomic force microscopy of reovirus dsRNA: a routine technique for length measurements", Nucleic Acids Research, Jun. 1992, vol. 20, No. 15, pp. 3983–3986.

Lyubchenko, et al., "Atomic Force Microscopy Imaging of Double Stranded DNA and RNA", Journal of Biomolecular Structure & Dynamics, 1992, vol. 10, Issue No. 3, pp. 589–606.

Mazur, et al., "Resonant Tunneling Bands and Electrochemical Reduction Potentials", Abstract, Washington State University, pp. 1–16.

Plueddemann, E., "Silane Coupling Agents", Second Edition, Plenum Press, pp. cover–xi.

Rees, et al., "Evidence of DNA Bending in Transcription Complexes Imaged by Scanning Force Microscopy", Science, Jun. 11, 1993, vol. 260, 1646–1649.

Schueir, et al., "Creating and observing surface features with a Scanning Tunneling Microscope", SPEI, vol. 897, Scanning Microscopy Technologies and Applications (1988), pp. 16–19.

Steitz, Thomas, "Structural studies of protein–nucleic acid interaction: the sources of sequence–specific binding", Quarterly Review of Biophysics, 23, 3 (1990), pp. 205–280.

Thundat, et al., "Atomic Force Microscopy of DNA on MICA and Chemically Modified Mica", Scanning Microscopy, 1992, vol. 6, No. 4, (pp. 911–918).

Yang, et al., "Atomic force microscopy of DNA molecules", Federation of European Biochemical Societies, Apr. 1992, vol. 301, No. 2, pp. 173–176.

P. S. Jung, "Novel Stationary–Sample Atomic Force Microscope with Beam–Tracking Lens", Dec. 14, 1992.

Stephen A. Joyce, "Mechanical Relaxation of Organic Monolayer Films Measured by Force Microscopy", Physical Review Letters, vol. 68(18), pp. 2790–2793, May 4, 1992.

G. Binnig, "Single–Tube Three–Dimensional Scanner for Scanning Tunneling Microscopy", Rev. Sci. Instrum. 57 (8), pp. 1688–1689, Aug. 1986.
B. Drake, "Imaging Crystals, Polymers, and Processes in Water with the Atomic Force Microscope", Science, vol. 243, pp. 1586–1589, Mar. 24, 1989.
Richard Sonnenfeld, "Atomic–Resolution Microscopy in Water", Science, vol. 232, pp. 211–213, Apr., 11, 1986.
P. Davidson, "A New Symmetric Scanning Tunneling Microscope Design", Journal of Vacuum Science & Technology: Part A, pp. 380–382, Mar./Apr. 1986.
O. Marti, "Atomic Force Microscopy of Liquid–covered Surfaces: Atomic Resolution Images", Appl. Phys. Lett. 51(7), pp. 484–486, Aug. 17, 1987.
M. D. Kirk, "Low Temperature Atomic Force Microscopy", Rev. Sci. Instrum. 59(6), pp. 833–835, Jun. 1988.
Richard Sonnenfeld, "Semiconductor Topography in Aqueous Environments: Tunneling Microscopy of Chemomechanically Polished (001) GaAs", 320 Applied Physics Letters 50(24), pp. 1742–1744, Jun. 15, 1987.
S. A. Chalmers, "Determinaton of Tilted Superlattice Structure by Atomic force Microscopy", 320 Applied Physics Letters 55(24), pp. 2491–2493, Dec. 11, 1989.
O. Marti, "Control Electronics for Atomic Force Microscopy", Rev. Sci. Instrum., vol. 59(6) pp. 836–839, Jun. 1988.
Exhibit C, p. 691, copyright 1986.
Exhibit B, Paul West, "Chemical Applications of Scanning Tunneling Microscopy", IBM J. Res. Develop. vol. 30(5), pp. 484–490, Sep. 1986.
Exhibit A, John Adam Kramer, Candicacy Report, pp. 1–48, May 21, 1985.
C. Mathew Mate, "Research Report–Determination of Lubricant Film Thickness on A Particulate Disk Surface by Atomic Force Microscopy", Apr. 25, 1989.
Y. Martin, "Atomic Force Microscopy–Force Mapping and Profiling on a Sub 100–A Scale", J. Appl. Phys. 61(10), May 15, 1987.
H. Hanselmann, "Implementation of Digital Controllers–A Survey", Automatica, vol. 23(1) pp. 7–32, 1987.
B. B. Damaskin, "Comprehensive Treatise of Electrochemistry vol. 1: Chapter 8: The Absorption of Organic Moelcules", pp. 353–395.
G. Travaglini, "Scanning Tunneling Microscopy on Biological Matter", Surface Science 181, pp. 380–390, 1987.
F. Ohnesorge, "True Atomic Resolution by Atomic Force Microscopy Through Repulsive and Attractive Forces", Science vol. 260, pp. 1451–1456, Jun. 4, 1993.
Allan J. Melmed, "Art and Science and other Aspects of Making Sharp Tips", J. Vac. Sci. Technol. B 9(2), pp. 601–608, Mar./Apr. 1991.
Inga Holl Musselman, "Platinum/Iridium Tips with Controlled Geometry Tunneling Microscopy", J. Vac. Sci. Technol. A, vol. 8(4), pp. 3558–3562 Jul./Aug. 1990.
J. P. Ibe, "On the Electrochemical Etching of Tips for Scanning Tunneling Microscopy", J. Vac. Sci. Technol. A, vol. 8(4), pp. 3570–3575, Jul./Aug. 1990.
L. A. Nagahara, "Preparation and Characterization of STM Tips for Electrochemical Studies".
Martin Specht, "Simultaneous Measurement of Tunneling Current and Force as a Function of Position Through A Lipid Film on A Solid Substrate", Surface Science Letters 257, pp. L653∝658, 1991.
M. Brede, "Brittle Crack Propagation in Silicon Single Crystals", J. Appl. Phys. 70(2), pp. 758–771, Jul. 15, 1991.
S. M. Hu, "Stress–Related Problems in Silicon Technology", J. Appl. Phys. 70(6), pp. R53–R80, Sep. 15, 1991.

POTENTIOSTATIC PREPARATION OF MOLECULAR ADSORBATES FOR SCANNING PROBE MICROSCOPY

Matter enclosed in heavy brackets [ ] appears in the original patent but forms no part of this reissue specification; matter printed in italics indicates the additions made by reissue.

INTRODUCTION

[This] *The* present invention relates generally to scanning probe microscopy and more particularly to *an apparatus and method for* the potentiostatic preparation of molecular adsorbates for study with scanning probe microscopes.

*This invention was made with Government support under contract No. N00014-90-J-1655 awarded by the Department of the Navy and grant DIR 89-20053 awarded by the National Science Foundation. The Government has certain rights in the invention.*

BACKGROUND OF THE INVENTION

Various ways have heretofore been proposed for chemically reacting molecules with a metal substrate in an electrochemistry cell. In some cases, the prior methodology allows molecules to be bonded strongly enough so that they can be imaged in a scanning tunnelling microscope (STM) or in [the] *an* atomic force microscope (AFM). However, in the case of negatively charged molecules, such as DNA, it is extremely difficult to get them to adhere to an electrode because most metal surfaces are intrinsically negatively charged and, as such, repel the molecule. Thus a clear need exists for new and improved technology for the potentiostatic preparation of negatively charged [molecules] *molecular* adsorbates such as DNA to enable them to be properly bonded to *a* suitable substrate so *that* they can be imaged in *a* scanning tunnelling microscope [(STM)] or *an* atomic force [microscopes (AFM)] *microscope*. It is [toward] *to* this end that the present invention is directed.

BRIEF SUMMARY OF THE INVENTION

The present invention is predicated upon the discovery of a remarkably simple procedure for getting negatively charged molecules onto a substrate and holding them there. The new methodology is based in part on the concept that DNA (or any other negatively charged molecule) can be attracted to a surface which is positively charged by virtue of its interaction with an electrolyte ([See: Lindsay et al, 1988] *See: Lindsay, S. M., and Barris, B., "Imaging DNA Molecules on a Metal Surface Under Water by STM", Journal of Vacuum Science and Technology. Vol. A6, Pages 544–547 (1988)*). What is new and unexpected is that the same forces that attract the molecules to the surface are capable, in the practice of the present invention, of holding such molecules in place on that surface for study in an [SPM] *STM* or an AFM. More particularly, the present invention relates to the potentiostatic preparation of molecular adsorbates for scanning probe microscopy in an electrochemical cell having a gold substrate, a platinum wire counter electrode and a silver wire reference electrode placed upon the microscope. The polymer to be observed is dissolved into a buffer solution which is non-reactive with the gold in the substrate and thereafter quickly deposited upon the substrate. Once the cell is filled, the reference electrode and the counter [electrodes] *electrode* are connected and a stable layer of adsorbate is formed on the gold electrode where it can be readily scanned with the microscope probe.

Accordingly, the principle object of the present invention is to provide new and improved methodology for preparing molecular adsorbates for scanning probe microscopy.

Another object of the present invention is to provide methodology especially adapted to potentiostatically prepared negatively charged molecular adsorbates for scanning probe microscopy.

These and still further objects as shall hereinafter appear are readily fulfilled by the present invention in a remarkably unexpected manner as will be readily discerned from the following detailed description of an exemplary embodiment thereof especially when read in conjunction with the accompanying drawing [in which like parts bear like numerals throughout the several views].

DESCRIPTION OF PREFERRED EMBODIMENT

Figure 1:
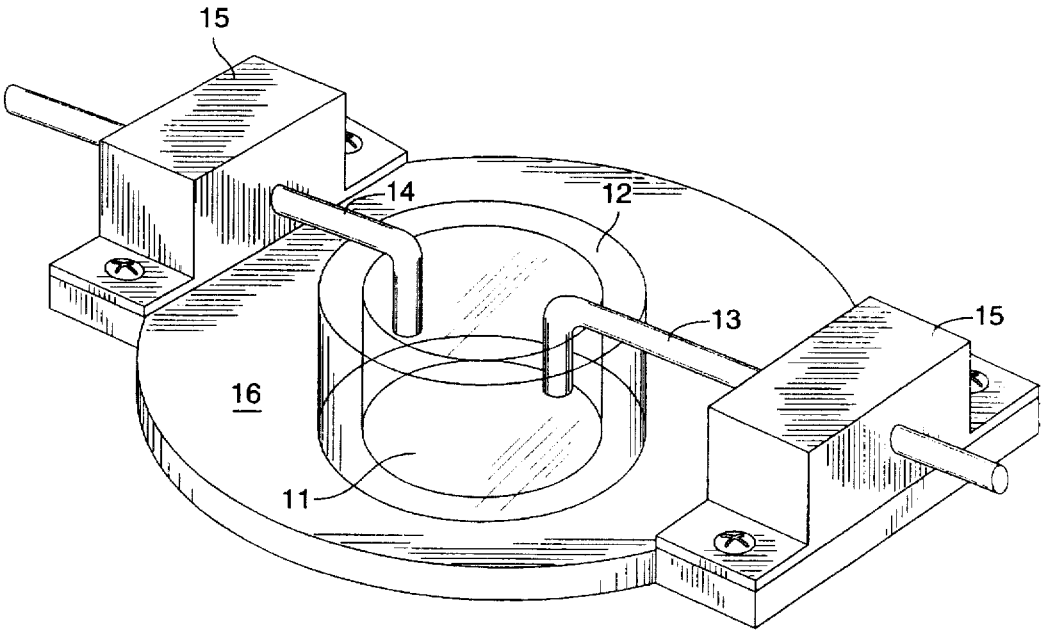
FIG. 1[.] is a schematic drawing of a simple electrochemical cell *according to the present invention*.

A small electrochemistry cell is mounted on an STM or AFM as described in my prior U.S. Pat. No. 4,868,396. A sketch of the current simplified cell is shown in FIG. 1. The substrate is Au (111), the counter electrode a platinum wire and the reference electrode a silver wire. It has been discovered that silver wires produce results that are identical to Ag/AgCl/KCl reference electrodes in these particular solutions, but are much easier to use and do not cause chlorine contamination of the substrate.

One practical arrangement of an electrochemistry cell is shown in FIG. 1. Referring to FIG. 1, the electrochemistry cell is designated by the general reference 10 and comprises a gold-on-mica substrate 11[,] *and* a glass cell 12, having a polished bottom that forms a seal against the gold substrate. A platinum (Pt) wire counter electrode 13 and a silver (Ag) wire reference electrode 14 extend into cell 12. Each of these wires are longer than needed and a fresh cut surface is introduced into the cell for each experiment by advancing the [electrode] *electrodes* 13, 14 in [its] *their* respective electrode [holder] *holders* 15, 15. A stainless steel plate 16 is glued to the lower exterior surface of glass cell 12 to hold down the substrate 11 and make electrical contact with the gold.

Cleanliness is critical. As will appear, an excess length of wire is used for each wire electrode. Before starting the next run, the used portion of the wire is cut away and a portion of the fresh wire is advanced into the cell. A fresh gold substrate is also used for each run.

Figure 2:
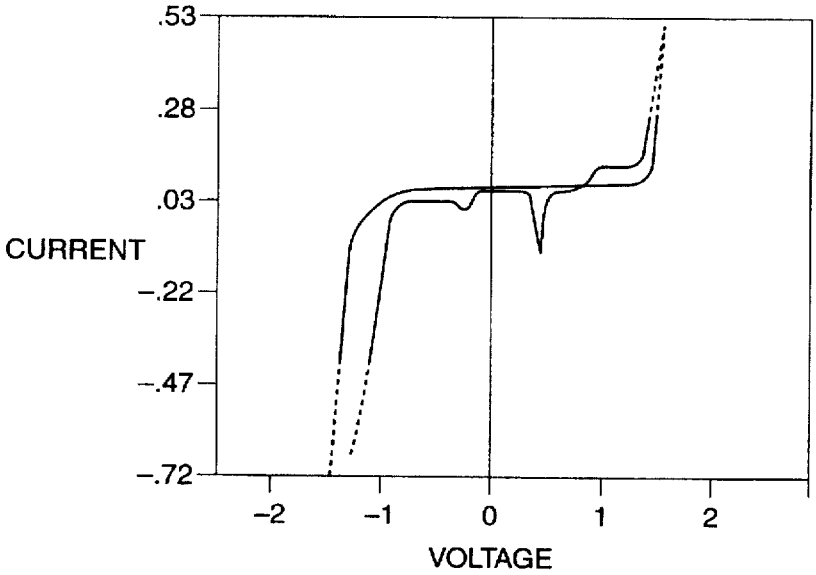
FIG. 2 is a cyclic voltammogram of a solution used for deposition of DNA taken in situ using a phosphate buffer solution adjusted to pH=6 with NaOH and containing [5 micrograms 5/ml] *5 micrograms per milliliter* of DNA.

In one practice of the present invention, a substrate is loaded onto the SPM. Clean reference and counter electrodes are placed into a clean glass cell on the substrate as shown in FIG. 1. The polymer is dissolved into a buffer solution that does not react with the gold over the appropriate range of substrate potentials. One suitable buffer solution for use with Au (111) between −1.2 and [=] + 1.3 V (vs. the Ag reference) is $NaH_2PO_4$[.] (10 mM adjusted to pH6 with NaOH). A cyclic voltammogram taken in situ is shown in FIG. 2. For sparse coverage of the electrode, a solution that, at full adsorption, gives less [that] *than* a monolayer coverage of the macromolecule is used. For example, in a 50 microliter cell (0.5 $cm^2$ electrode area) less than 5 micrograms of DNA per mL of solution are required.

The solution is placed onto the substrate as quickly as possible (to minimize contamination) and, once the cell is full, the reference and counter electrodes are connected. Any positive potential (in case of DNA) between the potentials at which reactions occur (from −0.2 V vs. Ag to +0.6 V vs. Ag; the DNA bases oxidize at higher voltage) may be applied to the substrate. There are some small reversible phosphate [absorptions] *adsorptions* at lower potentials, but in the double-layer region macromolecules can be seen in stable arrangements all the way up to about 1 volt. The voltage employed in any given reading is correlated to the reference electrode. The voltage required for deposition is dependant upon the salt solution used. The values reported herein are for the phosphate buffer solution.

If the solutions are free of contamination and, in the case of the STM, the tip is well insulated, a very stable layer of [absorbate] *adsorbate* is formed on the gold electrode. It may be scanned in situ repeatedly with no sign of sample movement or degradation. Indeed this is the salient feature of this invention, namely that [the] an adsorbate, when under potentiostatic control, is remarkably stable. Furthermore, the adsorbate layer may be lifted [on and off] *off and placed back on* the electrode surface at will simply by cycling the substrate potential between a positive value and −0.2 V (vs. Ag). Of course, these conditions represent a much diminished disruption of the solvated structure of the polymers compared to methods where the adsorbate is chemically reacted onto the substrate.

The coverage of the substrate, even with the simple layout shown in FIG. 1, is remarkably homogeneous. The whole problem of molecular microscopy is now reduced to scanning an area large enough to contain a few molecules (as calculated from the expected coverage, given the cell geometry and sample concentration) and then applying a suitable potential. Furthermore, reactions and various dynamic processes may be studied simply by allowing them to proceed in the cell (using components and a potential that avoid irreversible reactions) and then applying [and] *an* attractive charge to the substrate.

Finally it should be noted that the problem of contamination is greatly reduced. Only those molecules that satisfy conditions for physical adsorption appear in the image. In contrast a vacuum or ambient image would show all contaminants.

This method can also be used to hold positively charged molecules providing the reaction current due to dissolved oxygen is eliminated. This may be done *by* using degassed solutions and by operating in an inert gas [enviroment] *environment*.

Experiments demonstrate that this method yields excellent high resolution images of macromolecular [absorbates] *adsorbates* in both the STM and the AFM. The electrodes and buffers herein disclosed are intended as representative preferred materials and not by way of limitation thereon.

From the foregoing, it is readily apparent that a useful embodiment of the present invention has been herein described and illustrated which fulfills all of the [aforestated] *aforementioned* objectives in a remarkably unexpected fashion. It is of course understood that such modifications, alterations and adaptations as may readily occur to the artisan confronted with this disclosure are intended within the spirit of this disclosure which is limited only by the scope of the claims appended hereto.

Accordingly, what is claimed is:

1. A method of preparing molecular adsorbates for scanning probe microscopy comprising: loading a substrate into a cell; placing the cell on a scanning probe microscope; placing a clean reference electrode in said cell; placing a clean counter electrode in said cell in spaced relationship to said reference electrode; dissolving a polymer containing negatively charged molecules into a buffer solution that is inert relative to said substrate; filling said cell with said polymer [contained] *containing* buffer solution; activating said reference electrode and said counter electrode and applying a potential to said substrate to deposit and secure said polymer onto said substrate for examination by said microscope.

2. A method according to claim 1 in which said substrate is gold (111).

3. A method according to claim 1 in which said reference electrode is silver wire.

4. A method according to claim 1 in which said counter electrode is platinum wire.

5. A method according to claim 1 in which said buffer solution is $NaH_2PO_4$ at a pH of 6.

6. A method according to claim 3 in which said electrodes are activated to a voltage of from about −1.2 up to about + 1.3.

7. A method according to claim 5 in which said electrodes are activated to a voltage of from about −1.2 up to about + 1.3.

8. A method according to claim 2 in which said reference electrode is silver wire.

9. A method according to claim 8 in which said counter electrode is platinum wire.

10. A method according to claim 9 in which said buffer solution is $NaH_2PO_4$ at a pH of 6.

11. A method according to claim 10 in which said electrodes are activated to a voltage of from about −1.2 up to about + 1.3.

*12. A method of preparing molecular adsorbates for scanning probe microscopy comprising:*

*loading a substrate into a cell;*

*placing the cell on a scanning probe microscope;*

*placing a clean reference electrode in said cell;*

*placing a clean counter electrode in said cell in spaced relationship to said reference electrode;*

*dissolving a polymer containing charged molecules into a buffer solution that is inert relative to said substrate;*

*filling said cell with said polymer containing buffer solution;*

*activating said reference electrode and said counter electrode; and*

*applying a potential between said substrate and said counter electrode to deposit and secure said polymer onto said substrate for examination by said microscope.*

*13. A method according to claim 12 in which said substrate comprises gold.*

*14. A method according to claim 12 in which said reference electrode is silver wire.*

*15. A method according to claim 12 in which said counter electrode is platinum wire.*

*16. A method according to claim 12 in which said buffer solution is $NaH_2PO_4$ at a pH of 6.*

*17. A method according to claim 13 in which said substrate is activated to a voltage in a range of about −1.2*

*volts up to about +1.3 volts with respect to said reference electrode by application of a suitable voltage to said counter electrode.*

*18. A method according to claim 14 in which said substrate is activated to a voltage in a range of about −1.2 volts up to about +1.3 volts with respect to said reference electrode by application of a suitable voltage to said counter electrode.*

*19. A method according to claim 15 in which said substrate is activated to a voltage in a range of about −1.2 volts UP to about +1.3 volts with respect to said reference electrode by application of a suitable voltage to said counter electrode.*

*20. A method according to claim 16 in which said substrate is activated to a voltage in a range of about* −1.2 volts up to about +1.3 volts with respect to said reference electrode by application of a suitable voltage to said counter electrode.

*21. A method according to claim 13 in which said reference electrode is silver wire.*

*22. A method according to claim 15 in which said reference electrode is silver wire.*

*23. A method according to claim 13 in which said counter electrode is platinum wire.*

*24. A method according to claim 16 in which said counter electrode is platinum wire.*

*25. A method according to claim 23 in which said buffer solution is* $NaH_2PO_4$ *at a pH of 6.*

*26. A method according to claim 25 in which said substrate is activated to a voltage in a range of about −1.2 volts up to about +1.3 volts with respect to said reference electrode by application of a suitable voltage to said counter electrode.*

*27. An electrochemical fluid cell and substrate assembly for use in studying molecular adsorbates with a scanning probe microscope, said cell comprising:*

*an electrically conductive substrate;*

*an electrically insulating cell wall having an inner boundary defining a fluid container open at its top, said fluid container having a bottom boundary defined by said substrate;*

*said substrate having a portion extending under and beyond said inner boundary;*

*a reference electrode extending from beyond said fluid container into said fluid container through said top;*

*a counter electrode extending from beyond said fluid container into said fluid container through said top and maintained in spaced relationship to said reference electrode;*

*a voltage potential capable of being applied to said substrate by connecting said voltage potential to said electrically conductive substrate at said portion extending under and beyond said inner boundary.*

*28. An electrochemical fluid cell and substrate assembly according to claim 27 wherein said substrate comprises gold.*

*29. An electrochemical fluid cell and substrate assembly according to claim 27 wherein said reference electrode is silver wire.*

*30. An electrochemical fluid cell and substrate assembly according to claim 27 wherein said counter electrode is platinum wire.*

*31. An electrochemical fluid cell and substrate assembly according to claim 28 wherein said reference electrode is silver wire.*

*32. An electrochemical fluid cell and substrate assembly according to claim 28 wherein said counter electrode is platinum wire.*

*33. An electrochemical fluid cell and substrate assembly according to claim 28 wherein said reference electrode is silver wire and said counter electrode is platinum wire.*

*34. An electrochemical fluid cell and substrate assembly for use in studying molecular adsorbates with a scanning probe microscope, said cell comprising:*

*an electrically conductive substrate;*

*an electrically insulating cell wall having an inner boundary defining a fluid container open at its top, said fluid container having a bottom boundary defined by said substrate;*

*said substrate in electrical contact with a conductor having a portion extending under and beyond said inner boundary;*

*a reference electrode extending from beyond said fluid container into said fluid container through said top;*

*a counter electrode extending from beyond said fluid container into said fluid container through said top and maintained in spaced relationship to said reference electrode;*

*a voltage potential capable of being applied to said substrate by connecting said voltage potential to said electrically conductive substrate at said portion of said conductor extending under and beyond said inner boundary.*

*35. An electrochemical fluid cell and substrate assembly according to claim 34 wherein said substrate comprises gold.*

*36. An electrochemical fluid cell and substrate assembly according to claim 34 wherein said reference electrode is silver wire.*

*37. An electrochemical fluid cell and substrate assembly according to claim 34 wherein said counter electrode is platinum wire.*

*38. An electrochemical fluid cell and substrate assembly according to claim 35 wherein said reference electrode is silver wire.*

*39. An electrochemical fluid cell and substrate assembly according to claim 35 wherein said counter electrode is platinum wire.*

*40. An electrochemical fluid cell and substrate assembly according to claim 35 wherein said reference electrode is silver wire and said counter electrode is platinum wire.*

* * * * *